June 5, 1951
C. H. REAVES ET AL
2,555,419
LIVE CENTER CHUCK
Filed Sept. 16, 1949
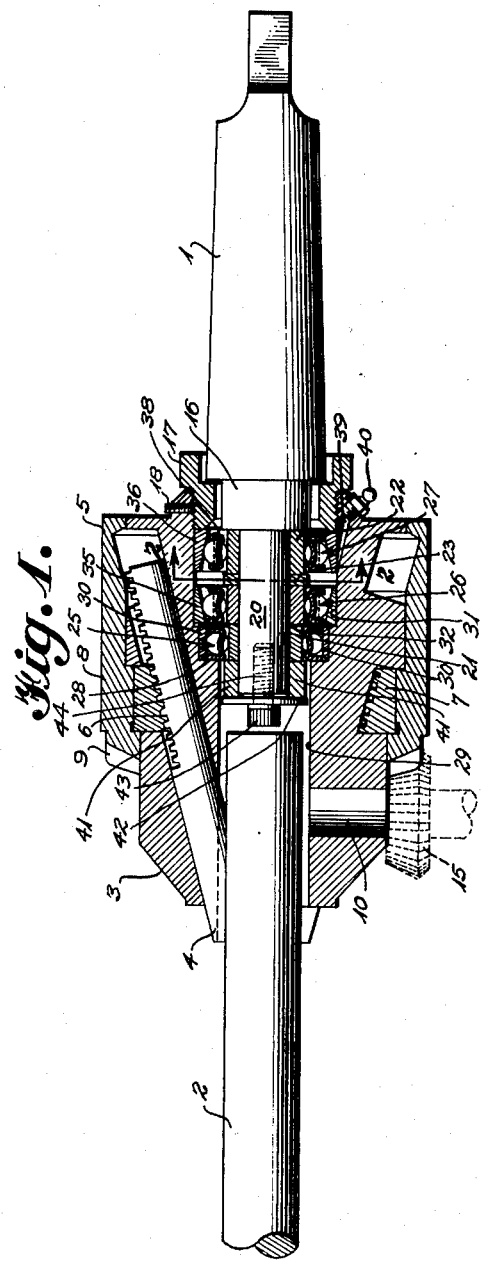
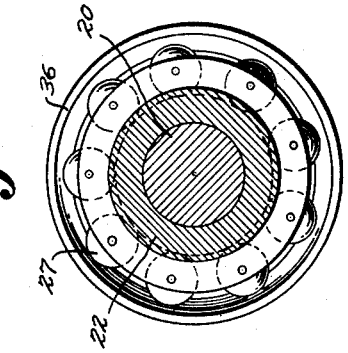
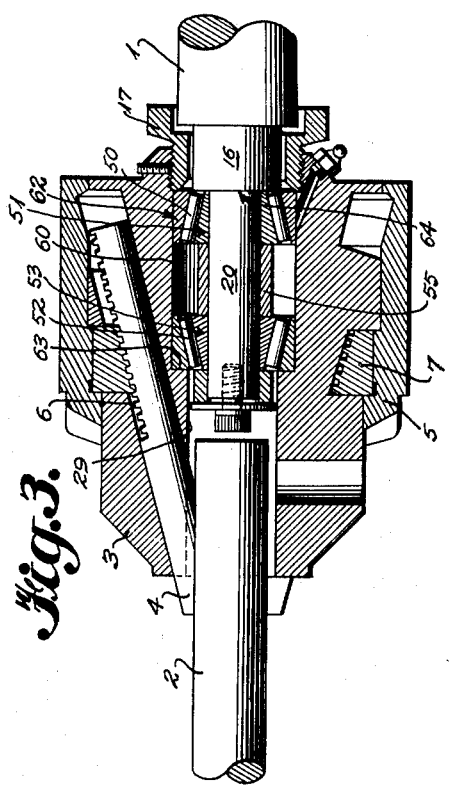
INVENTORS
CLAUDE H. REAVES
GUERRY B. LONG, SR.
BY Charles M. Thomas
ATTORNEY Patented June 5, 1951

2,555,419

UNITED STATES PATENT OFFICE 2,555,419

LIVE CENTER CHUCK

Claude H. Reaves and Guerry B. Long, Sr.,
Tampa, Fla.

Application September 16, 1949, Serial No. 116,007

3 Claims. (Cl. 279—16)

This invention relates to a live center chuck, and more particularly, to a device for rotatably mounting a piece of material between the head stock and the tail stock of a turning lathe, the manner of positioning the work in the lathe being of such nature that the same is freely rotated independently of the shank and is automatically centered for rotation at high speeds.

Ordinarily, to center work in a turning lathe the piece must be punch marked at either end or at least at the end adjacent the tail stock of the lathe. If the mark is slightly off center with respect to the axis of rotation it is impossible to properly turn the piece at high speeds. In normal practice also, the tail supporting member, or shank, normally inserted in the tail stock of a lathe, is stationary with respect to the work centered in the lathe, the shank commonly being adjusted to the desired position and then locked in the tail stock. By our invention, the necessity of accurately locating the center point of work to be mounted in a lathe is obviated, the centering being accomplished automatically. Our invention also contemplates free rotation of the centering device independently of the tail piece or shank which is mounted for non-rotation, as described, in the tail stock, the improvement comprising our invention reducing friction at high speeds to an absolute minimum.

Accordingly, it is an objective of this invention to provide a mechanism which will automatically position work to be machined in a turning lathe on the exact center line or center axis between head stock and tail stock of the lathe.

It is a further object of the invention, in addition to the foregoing, to provide a device wherein the centered piece may be rotated at high speeds without rotation of the shank member, which can be locked in fixed position in the tail stock in accordance with usual practice.

A further objective of this invention is to provide a device of the class described which combines the inherent utility of a rotating tail stock, a self-centering device within the casing of the tail stock and a chuck member which permits the rotating member to be adapted to various sized pieces of work which it is desired to mount between centers of a turning lathe.

The device of our invention is of relative simplicity. The moving parts involved and the complexities of the assembly have been reduced to a minimum so that manufacture of the invention on a comparatively large scale may be accomplished with comparative ease and great economy. This device is particularly useful in centering such mechanisms as armature shafts in a lathe for the purpose of truing the shafts and performing other work thereon which is normally necessary in reconditioning procedures. We have found that the centering device herein described has particular advantages in handling armature shafts generally utilized in either the starting motors or the generator motors of automotive engines. It is adapted to be utilized in the machine shop where ease of mounting and adaptability to various sized shafts is a primary consideration.

There are various other advantages and uses of this invention which will become more apparent from the following description thereof and the accompanying drawings. Referring to the latter:

Figure 1 is a longitudinal sectional view of a chuck centering device constructed in accordance with our invention.

Figure 2 is a cross-section taken on the line 2—2 of Figure 1.

Figure 3 is a cross-sectional view of a modification of the invention shown in Figure 1.

Referring more particularly to the drawings, it will be seen that 1 designates a supporting member or shank having the usual configuration necessary for insertion and locking in the tail stock of a turning lathe.

The shaft of a piece to be mounted in the lathe, such as an armature shaft, is represented at 2. A rotatable casing 3 is made in the form of a chuck device, and contains elements 4 which are slidably mounted in chambers 5 for relative movement with respect to the casing and for adaptation thereof to various sized circumferences. The chuck jaws herein shown are provided with teeth 6, adapted to engage corresponding threads of a jaw operating ring 7. The latter is actuated by a rotating sleeve 8, in turn fitted with gear elements 9. The sleeve is rotated through the use of the usual pinion key 15, which is inserted as desired for that purpose in a suitable aperture 10 in the chuck casing. Rotation of the sleeve therefore results in corresponding reciprocation of the chuck jaws, the latter movement providing adjustment of the jaws to the desired opening.

The chuck casing 3 is bored to receive in proper fashion a series of ball or roller bearing elements which rotatably mount the casing, and of course, the work received by the aforesaid jaws 4, upon the shank member 1. At the end of the casing nearest the tail stock or shank 1, the bore of the casing is threaded so as to receive a threaded nut 17, the latter, as in Figure 1, being itself suitably bored to receive the shank member 1. The latter is reduced in diameter, as at 16, sufficiently to receive the nut member 17 and may be fitted with a grease retainer between it and the threaded nut 17. Nut 17 is locked in adjusted position by a screw 18 mounted in the casing in such position as to engage the threads of the nut 17 when it is desired to maintain the latter in a certain adjusted position.

The remaining portion 20 of shank 1, adjacent the reduced diameter 16 of the shank, is also further reduced in size. As shown, the length 20 is fitted with bushings of various sizes to receive the ball bearing units, although it is evident that instead of separate bushings being employed, the shaft 20 may be turned at this section to provide diameters equivalent in size and function to the said bushings. If these shaft diameters are varied by the use of bushings, rather than turned segments integral with the shank 1, then they are press fitted over segment 20 of the shank. Bushing or section 21 is of smaller overall diameter than the adjacent section 22. The latter at a position intermediate its ends, is fitted with a raised portion or additional bushing 23, located at its midsection and dividing 22 into two bearing supports of equal size.

Referring to Figure 1, it will be seen that the bore of the casing 3 runs throughout its entire length but varies in size in different portions thereof to accommodate the several bearing units which permit not only free and independent rotation of the casing, but perform also the self-centering function.

The bore at the end of the casing which accommodates the chuck jaws, is of the smallest internal diameter, as indicated at 29. It is increased in size as at 30 to receive a relatively small pilot bearing 25 with the shoulder 32 absorbing the thrust of the casing 3 against unit 25. The raceway 28 of the pilot bearing is of the same internal and external diameter throughout its length. The remainder of the bore is further enlarged at 31 for the reception of two opposed adjustable bearings 26 and 27. These adjustable bearings have tapered raceways, which perform the centering function. For instance, the adjustable bearing adjacent the pilot bearing has a raceway 35 which is of less thickness toward the end adjacent separating member 23. At its opposite end the raceway is considerably thicker. Also the second adjacent bearing has a similar type of raceway 36, the side thereof facing the first adjustable bearing being of greater internal diameter than that portion facing shank 1. As shown in Figure 1, ball bearings of the usual type are here utilized in the pilot bearing and in both of the adjustable bearings, all of the bearings also employing a suitable cage 38 for retention of the ball bearings within their respective raceways.

As stated, although the bore in the casing in which both of the adjustable bearings are located is here shown as being of the same internal diameter throughout, a smaller bore accommodates the pilot bearing 25, thereby permitting independent action between the latter and the described adjustable bearings.

It is desirable to have some means by which this bearing arrangement may be grease packed and to this end a passageway 39 leading to the bearing chamber is provided, having a suitable grease fitting 40 fitted therein.

In operation of the foregoing device, it will be appreciated that some of the end thrust will be absorbed by the pilot bearing 25 which may be press fitted onto the collar 21. The pilot bearing is adapted to primarily absorb the radial pressure imposed by the chuck casing 3, whereas the adjustable bearings are adapted to automatically center the piece 2 in the tail stock. By nature of the angular bearing surfaces of each of the raceways 35 and 36, the piece is forced to assume a position on the center line. This result can further be perceived by noting that the jaws 4 will engage the circumference of the piece, the latter being brought into position as the adjustable bearings are brought together by screw 17.

Each of the aforesaid bearings will share its burden of thrust and axial alignment. The pilot bearing being mounted on collar 21 necessarily engages in endwise fashion collar 22. End thrust upon the pilot bearing is exerted by that bearing against the portion of member 22 projecting above bushing 21 here designated at 32. The first adjustable bearing 35 exerts thrust against the intermediate member 23 and adjustable bearing 36 will exert thrust against the terminal face of screw 17 and the enlarged portion 16 of the supporting member 1.

To maintain the three described races in assembled position, an additional bushing 41 may be locked in place over the assembly through the use of retaining plate 42 and a suitable lock bolt 43, the latter being threaded for insertion in a threaded aperture 44 in the end of member 20. It will be seen that the entire assembly is readily removable from the supporting or shank member 1, merely by releasing lock nut 18, unscrewing element 17 and slipping the casing off from the various bearing elements referred to. The element 17 may be readily utilized to perform any necessary adjustment of the three races. It is desired that these races be brought into as close relationship as possible without binding in order that excess wear due to chattering be avoided. The element 17 provides for this adjustment, since when screwed towards the front or chuck end of the casing the various sized bores of the casing will be brought into close relationship with both the pilot bearing 25 and the referred to adjustable bearings, and each will absorb its portion of end thrust in the manner described.

In Figure 3 is shown an embodiment of the invention which is particularly useful where unusually heavy work is desired to be mounted in a lathe. In this modification the adjustable ball bearings referred to are supplanted by two tapered roller bearing races 51 and 53 within which are contained the usual type of rollers 50 and 52. These two races are separated by a sleeve 55, the said races being of the same size, and fitted into a common bore 60 in the chuck casing. They are maintained in place through media much similar to that hereinbefore described.

The outer raceways for these roller bearings are also tapered, having their greater internal diameters opposhtely positioned. Thus, outer raceway 62 is of greater internal diameter towards member 55 than at its opposite end, and raceway 63 is also of greater internal diameter towards the said member 55. The use of such tapered bearings perform the centering function in much the same manner as the piece is centered through the use of ball bearings heretofore described.

In this embodiment, the pilot bearing may be dispensed with and hence, only the single enlarged bore 60 being necessary to accommodate the two tapered roller bearings. End thrust of casing 3 is absorbed by bearing 53 through shoulder 63 and transmitted by sleeve 55 to the complementary bearing 51. The latter exerts thrust to the shoulder 64 of shaft 16 and also to the face of nut 17 when the latter is suitably adjusted. As stated, a fine adjustment of the relationship of these bearings is accomplished by the said screw 17, whereby smooth operation of the assembly without chattering is accomplished. Moreover, the method of centering the piece by means of this alternative construction is similar to that already referred to with respect to Figure 1. The centering takes place due to the angular configuration of the races 51 and 53 with respect to each other, the axis of the work piece automatically being brought into axial alignment between head and tail stock of the lathe.

In both of the constructions hereinbefore described, such centering of the piece is an entirely automatic procedure, the sloping interior surfaces of the bearing races in each instance permitting the piece to seek the center line axis, as described. The size of the piece can be varied without altering this self-centering characteristic. As stated, since the circumference is grasped by the chuck jaws, the need for punching a center hole in the piece or any further manual effort normally necessary to align the piece between centers, is of necessity, eliminated.

It is obvious that this invention may be varied in many ways and other expedients employed to accomplish the purposes thereof; however, it is to be understood that our invention is only limited by the scope of the following claims.

We claim:

1. In a floating chuck, means for self-centering a work-piece mounted in said chuck comprising a chuck casing having a longitudinal bore therethrough, adjustable jaw members at one end thereof, and a shank member in the opposite end thereof, said bore being of relatively small size at one portion thereof to accommodate the raceways of a pilot bearing to permit free circular rotation, and being of larger size at another portion thereof to accommodate the raceways of two adjacent adjustable bearings, said pilot bearing being mounted near the end of said shank member within the bore, said adjustable bearings being positioned adjacent thereto and separated by a raised collar on said shank member therebetween, said adjustable bearings having raceways of conical shape in cross-section, the ends of said raceways having the greatest internal diameters thereof being oppositely positioned, means for maintaining said casing upon said bearings and said shank member comprising a collar for threaded engagement with said casing at the end thereof opposite said jaws, said means permitting inward adjustment of said raceways and means for locking said collar in adjusted position, whereby upon tightening of said collar said raceways are so adjusted with respect to each other as to bring said piece in axial alignment with said shank member.

2. In a floating chuck, means for self-centering a work-piece mounted in said chuck comprising a chuck casing provided with a longitudinal bore and having adjustable chuck jaws to receive said piece for rotation in a turning lathe, a shank member, means for mounting and centering said piece upon said shank member, said means comprising a plurality of anti-friction ball bearing units mounted on a reduced portion of said member, one of said units having a raceway of the same internal diameter throughout, and being adapted to permit free circular rotation of said piece and two of said units having tapered raceways, said tapered raceways being positioned with their greater internal diameters oppositely disposed, and having larger outside diameters than said first-named unit, said bore being provided with peripheral shoulders whereby thrust is imparted to each of said anti-friction units and means to retain said casing upon said units and said shank member comprising a plate member rotatably mounted on said shank member in threaded engagement with said casing, whereby upon tightening of said plate member by rotation thereof, said tapered raceways are so adjusted with respect to each other as to bring said piece in axial alignment with the shank member.

3. In a floating chuck, means for self-centering a work-piece mounted in said chuck comprising a chuck casing provided with a longitudinal bore and having adjustable chuck jaws to receive said piece for rotation in a turning lathe, a shank member, means for rotatably mounting and centering said element upon said shank member, said means comprising two anti-friction roller bearing units mounted on one end of said shank member, said units having tapered outer raceways and positioned with the greater internal diameters thereof oppositely disposed, said bore being provided with concentric shoulders whereby radial and axial thrust is exerted upon said units, and means to adjustably retain said units and the end of said shank member within said casing comprising a plate element mounted on said shank member for threaded engagement with said casing at the end thereof opposite said jaws, whereby upon tightening of said plate member by rotation thereof, said tapered raceways are so adjusted with respect to each other as to bring said piece in axial alignment with the shank member.

CLAUDE H. REAVES.
GUERRY B. LONG, Sr.

REFERENCES CITED

The following references are of record in the file of this patent:

UNITED STATES PATENTS

| Number | Name | Date |
|---|---|---|
| 1,011,975 | Lewis | Dec. 19, 1911 |
| 1,035,495 | Szeitl | Aug. 13, 1912 |
| 1,775,994 | Emnick | Sept. 16, 1930 |
| 1,776,675 | Bascom | Sept. 23, 1930 |
| 2,292,470 | Ostberg | Aug. 11, 1942 |